(12) United States Patent
Chang et al.

(10) Patent No.: US 12,338,930 B2
(45) Date of Patent: Jun. 24, 2025

(54) PIPELINE ALIGNMENT STRUCTURE AND ALIGNMENT PIPELINE THEREOF

(71) Applicant: PEGATRON CORPORATION, Taipei (TW)

(72) Inventors: Yun-Teng Chang, Taipei (TW); Cheng-Sheng Chang, Taipei (TW); Yu-Hsien Chen, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 463 days.

(21) Appl. No.: 17/901,998

(22) Filed: Sep. 2, 2022

(65) Prior Publication Data

US 2023/0136128 A1    May 4, 2023

(30) Foreign Application Priority Data

Nov. 3, 2021 (TW) .................................. 110141003

(51) Int. Cl.
*F16L 37/23* (2006.01)

(52) U.S. Cl.
CPC ..................................... *F16L 37/23* (2013.01)

(58) Field of Classification Search
CPC ....................................................... F16L 37/23
USPC ......................................................... 138/109
See application file for complete search history.

(56) References Cited

U.S. PATENT DOCUMENTS

| | | | | |
|---|---|---|---|---|
| 2,322,877 A * | 6/1943 | Parker | ...................... | F16L 37/23 251/149.6 |
| 3,508,580 A | 4/1970 | Snyder, Jr. | | |
| 4,924,909 A * | 5/1990 | Wilcox | ................... | F16L 37/34 137/614.05 |
| 6,511,100 B1 * | 1/2003 | Le Clinche | ............. | F16L 37/23 403/322.2 |
| 7,926,783 B1 * | 4/2011 | Liu | .......................... | F16L 37/23 251/149.6 |
| 10,458,584 B2 * | 10/2019 | Tiberghien | ............... | F16L 37/23 |
| 2002/0134959 A1 * | 9/2002 | Noble | ..................... | F16L 37/42 285/82 |
| 2002/0140227 A1 * | 10/2002 | Kawakami | .............. | F16L 37/23 285/316 |
| 2017/0307121 A1 * | 10/2017 | Imoto | .................... | F16L 37/146 |

FOREIGN PATENT DOCUMENTS

| | | |
|---|---|---|
| AT | 196437 B | 3/1958 |
| CN | 206600549 U | 10/2017 |
| CN | 112984252 A | 6/2021 |

* cited by examiner

*Primary Examiner* — David R Deal
(74) *Attorney, Agent, or Firm* — MUNCY, GEISSLER, OLDS & LOWE, P.C.

(57) ABSTRACT

An alignment pipeline is arranged on an outer casing and configured to connect to a communication pipe which has a communication pipe axis line. The alignment pipeline includes a pipe body, a connection piece, and a plurality of balls. The pipe body has a pipe body axis line, and includes a first end and a second end opposite to the first end. The first end is configured to connect to the communication pipe. The connection piece surrounds the pipe body, is arranged at the second end, and is movably connected to the outer casing. The plurality of balls is arranged on the connection piece in a rolling and dispersing manner. At least a part of the balls are in contact with the outer casing, so that the connection piece is movable relative to the outer casing along a radial direction of the pipe body axis line.

16 Claims, 5 Drawing Sheets

PIPELINE ALIGNMENT STRUCTURE AND ALIGNMENT PIPELINE THEREOF

TECHNICAL FIELD

The disclosure relates to a pipeline alignment structure and an alignment pipeline thereof, and in particular, to a pipeline alignment structure and an alignment pipeline thereof that can easily align a joint connection portion and reduce a risk of water leakage.

BACKGROUND

Computer devices in the market are often equipped with a water cooling system for heat dissipation inside the computer. Generally, a water cooling liquid pipeline in a computer device is a suitable circulation pipeline assembled by connecting a plurality of pipelines to each other. An end at a connection portion of the pipeline is usually designed as a male joint, and another end is a female joint. The male joint and the female joint are in surface contact and can slide along a contact surface, to align pipeline axis lines of the male joint and the female joint. An O-ring covers the outside of the contact surface of the male joint and the female joint to enhance a waterproof function.

However, because the male joint and the female joint are in surface contact, and moving resistance of the contact surface is relatively high, it is difficult to precisely adjust a contact position between the male joint and the female joint during assembly, and it is difficult to align the pipeline axis lines of the male joint and the female joint. In addition, when the male joint and the female joint slide along the contact surface, a gap may be formed between the contact surfaces of the male joint and the female joint. Therefore, liquid may still flow out from the gap, and a leak-proof effect that can be achieved by the O-ring is quite limited.

Therefore, how to provide a pipeline having a waterproof and alignment function to resolve the above problem has become a topic worthy of discussion.

SUMMARY

A main objective of the present invention is to provide an alignment pipeline that can easily align a joint connection portion and reduce a risk of water leakage.

In order to achieve the foregoing objective, an alignment pipeline of the present invention is arranged on an outer casing and configured to connect to a communication pipe. The communication pipe has a communication pipe axis line. The alignment pipeline includes a pipe body, a connection piece, and a plurality of balls. The pipe body has a pipe body axis line, and includes a first end and a second end opposite to the first end. The first end is configured to connect to the communication pipe. The connection piece surrounds the pipe body, is arranged at the second end, and is movably connected to the outer casing. The plurality of balls is arranged on the connection piece in a rolling and dispersing manner. At least a part of the balls are in contact with the outer casing, so that the connection piece is movable relative to the outer casing along a radial direction of the pipe body axis line. In this way, when the communication pipe is inserted into the first end, the connection piece moves relative to the outer casing, to align the pipe body axis line with the communication pipe axis line.

According to an embodiment of the present invention, the connection piece includes a first connection surface, the first connection surface faces the outer casing, and the part of the balls are arranged on the first connection surface and in contact with the outer casing.

According to an embodiment of the present invention, a quantity of the plurality of balls arranged on the first connection surface is at least 6.

According to an embodiment of the present invention, the alignment pipeline further includes a fixing base, where the fixing base is combined with the outer casing to form an accommodation space for accommodating the plurality of balls and the connection piece.

According to an embodiment of the present invention, the connection piece includes an outer edge, and a gap is formed between the outer edge and the fixing base.

According to an embodiment of the present invention, the connection piece includes a second connection surface, the second connection surface faces the fixing base, and the part of the balls are arranged on the second connection surface and in contact with the fixing base.

According to an embodiment of the present invention, a quantity of the plurality of balls arranged on the second connection surface is at least 6.

According to an embodiment of the present invention, the pipe body further includes a protruding structure arranged at the first end. The communication pipe further includes a limiting structure. When the communication pipe is inserted into the first end, the limiting structure limits movement of the protruding structure to achieve limiting.

According to an embodiment of the present invention, the alignment pipeline further includes a threaded portion, the threaded portion is arranged at the second end, and the connection piece is located between the threaded portion and the protruding structure.

Another main objective of the present invention is to provide a pipeline alignment structure that can easily align a joint connection portion and reduce a risk of water leakage.

To achieve the foregoing objective, a pipeline alignment structure of the present invention includes a communication pipe and the alignment pipeline described above. The communication pipe has a communication pipe axis line. A first end of the alignment pipeline is connected to the communication pipe, and a second end of the alignment pipeline is connected to an outer casing.

DETAILED DESCRIPTION

To understand the technical content of the present invention better, descriptions of specific preferred embodiment are provided below particularly.

Figure 1:
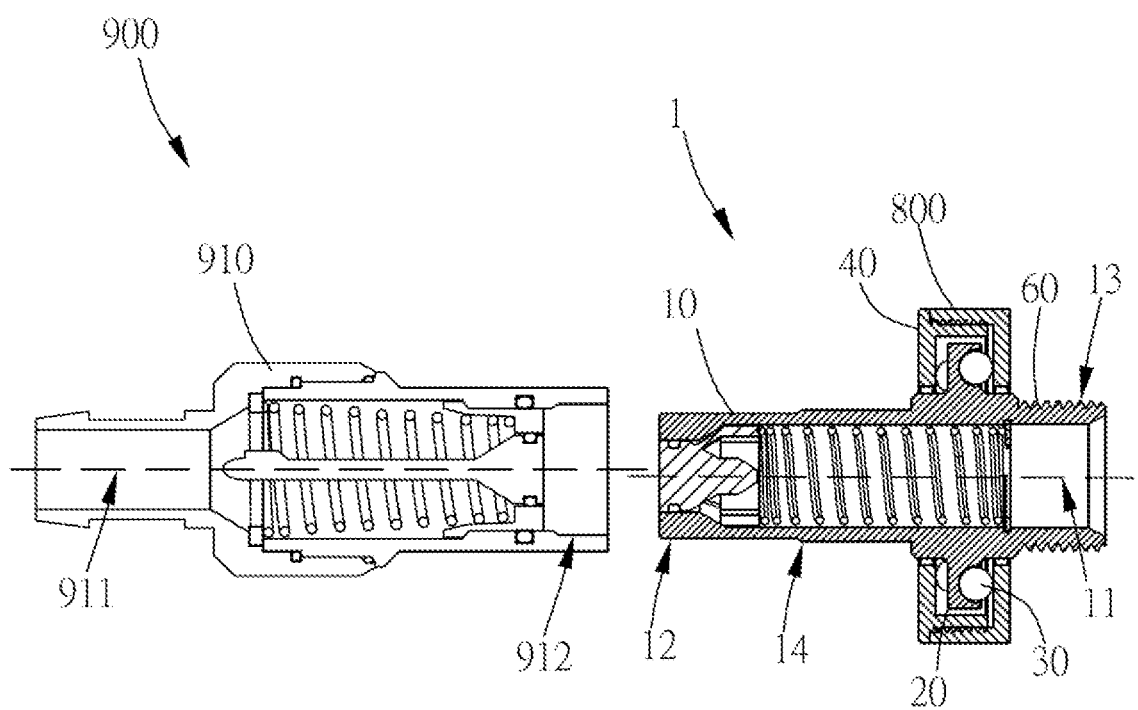
FIG. 1 is a schematic diagram of a pipeline alignment structure of an alignment pipeline and a communication pipeline that are uncombined according to an embodiment of the present invention.
Figure 2:
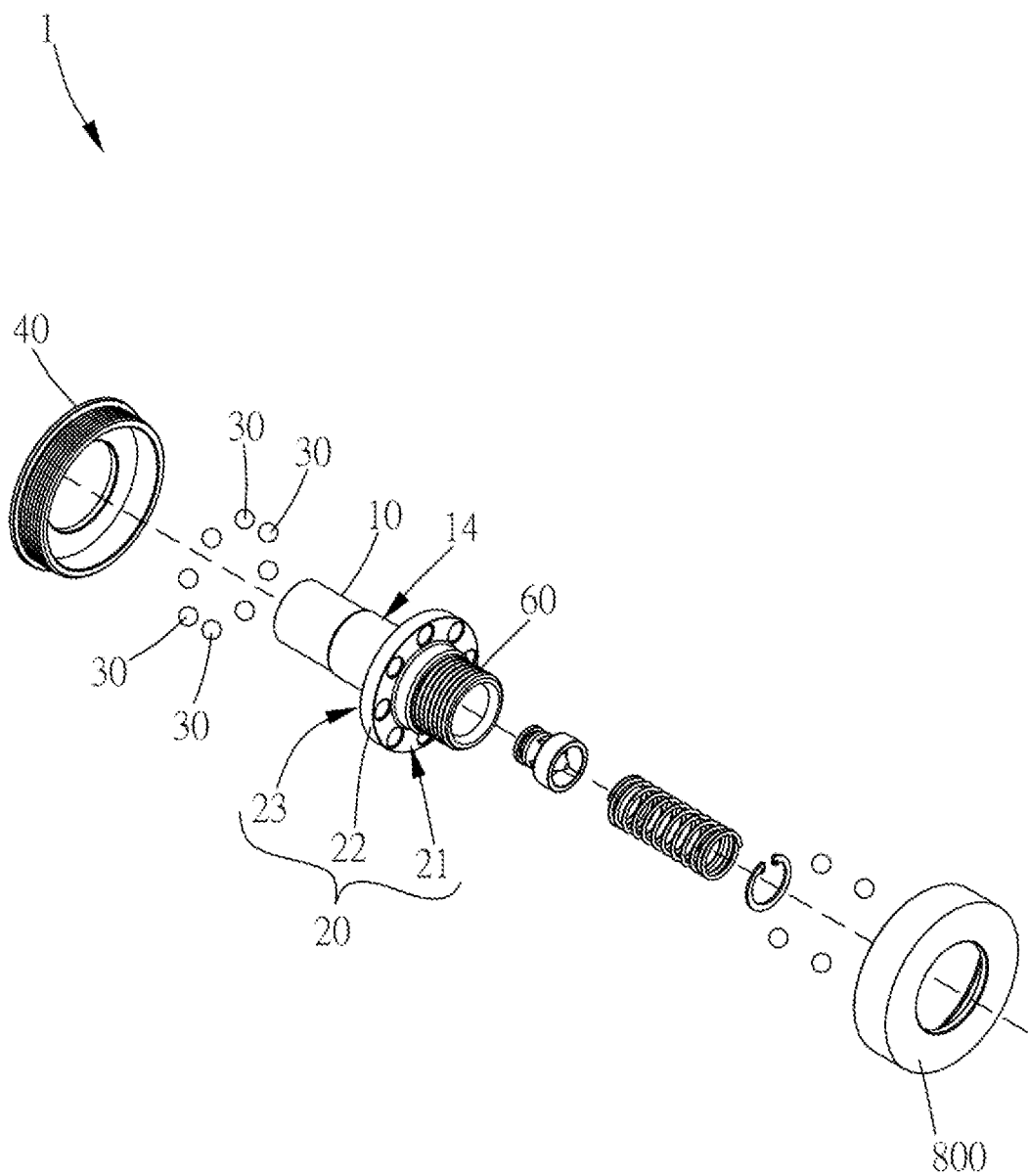
FIG. 2 is a schematic diagram of an alignment pipeline before a fixing base is mounted according to an embodiment of the present invention.
Figure 3:
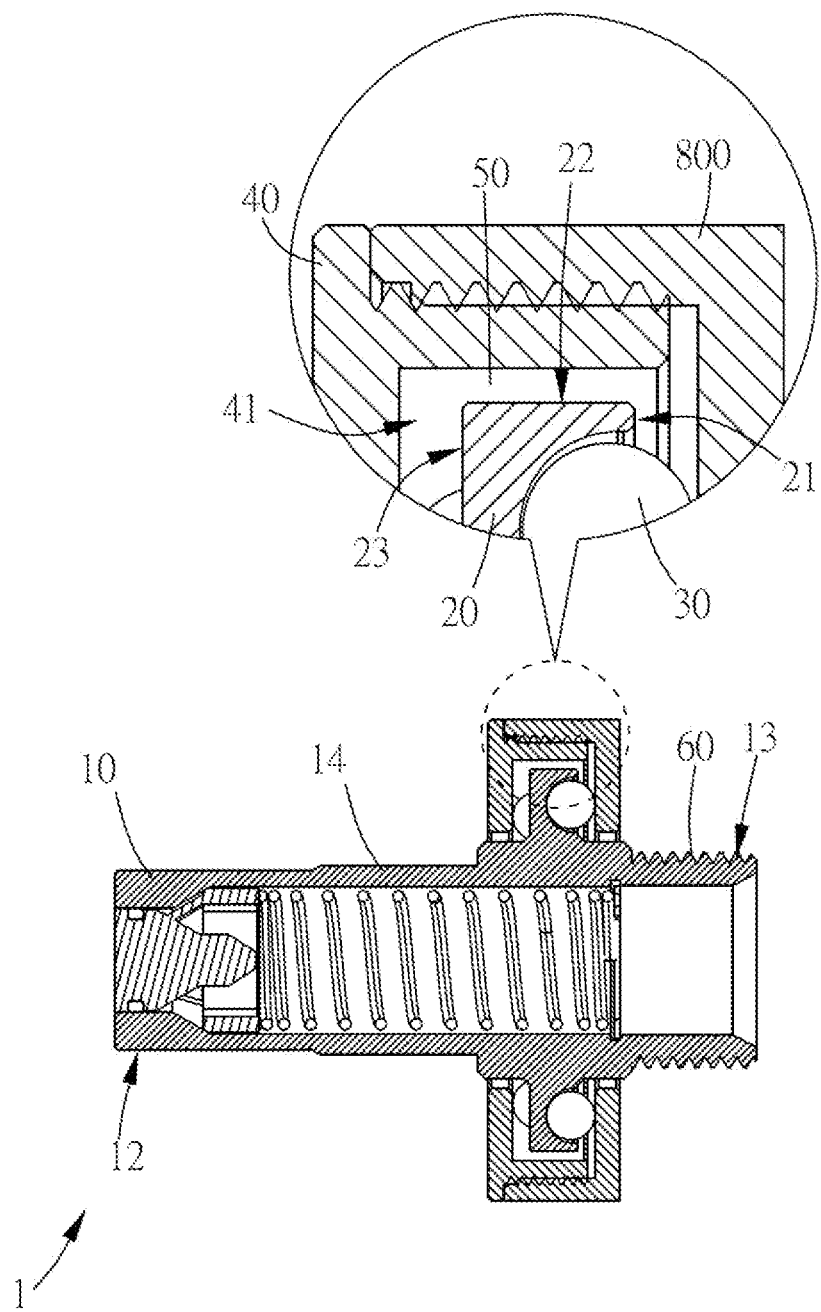
FIG. 3 is a schematic diagram of an alignment pipeline according to an embodiment of the present invention.
Figure 4:
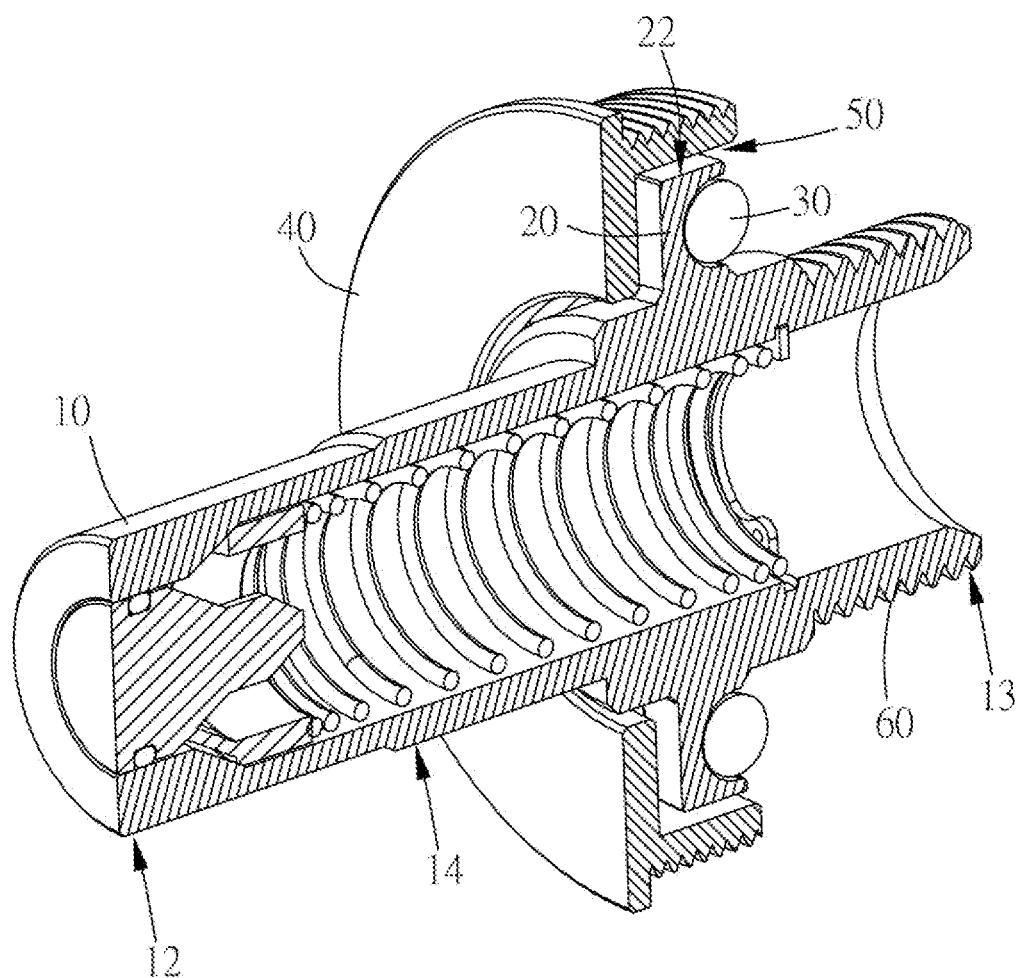
FIG. 4 is a cross-sectional view of an alignment pipeline according to an embodiment of the present invention.
Figure 5:
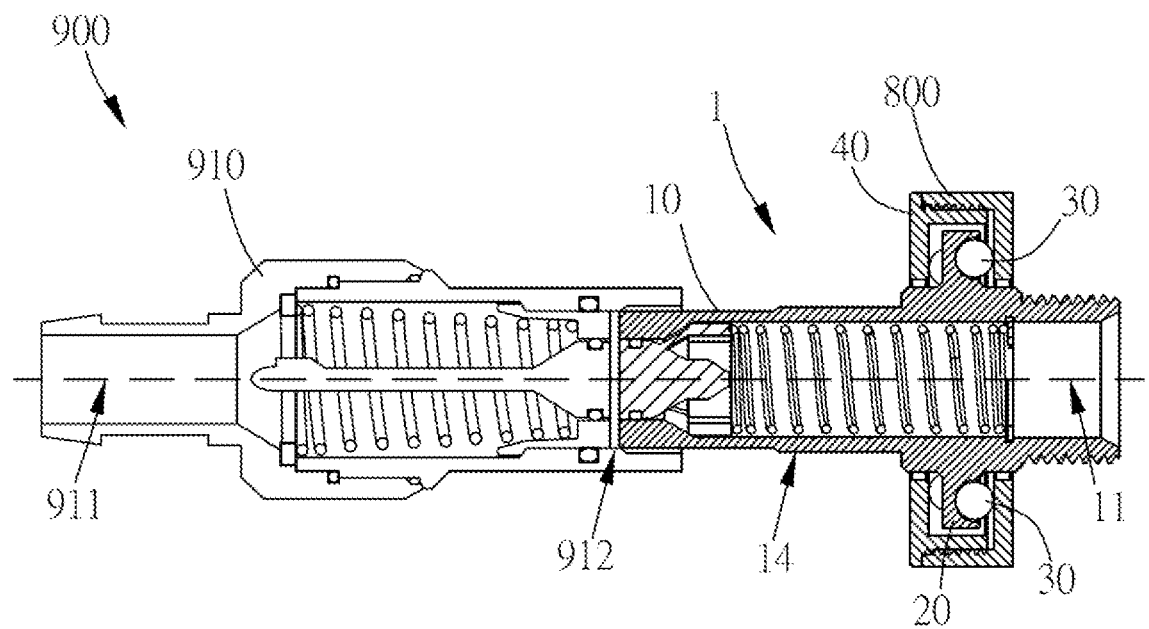
FIG. 5 is a schematic diagram of a pipeline alignment structure of an alignment pipeline and a communication pipeline that are combined according to an embodiment of the present invention.

For a pipeline alignment structure and an alignment pipeline according to an embodiment of the present invention, refer to FIG. 1 to FIG. 5 together below. FIG. 1 is a schematic diagram of a pipeline alignment structure of an alignment pipeline and a communication pipeline that are uncombined according to an embodiment of the present invention; FIG. 2 is a schematic diagram of an alignment pipeline before a fixing base is mounted according to an embodiment of the present invention; FIG. 3 is a schematic diagram of an alignment pipeline according to an embodiment of the present invention; FIG. 4 is a cross-sectional view of an alignment pipeline according to an embodiment of the present invention; and FIG. 5 is a schematic diagram of a pipeline alignment structure of an alignment pipeline and a communication pipeline that are combined according to an embodiment of the present invention.

As shown in FIG. 1 to FIG. 3, in an embodiment of the present invention, a pipeline alignment structure 900 is, for example, a liquid pipeline of a water cooling system mounted inside a computer, and the pipeline alignment structure 900 can easily align a joint connection portion of the pipeline and reduce a risk of water leakage. The computer includes an outer casing 800. The pipeline alignment structure 900 is arranged in the outer casing 800 of the computer. The pipeline alignment structure 900 includes a communication pipe 910 and an alignment pipeline 1. The communication pipe 910 is configured to allow liquid flow inside, and the communication pipe 910 includes a communication pipe axis line 911 and a limiting structure 912. The communication pipe axis line 911 is an axis line extending along a center of the communication pipe 910. The limiting structure 912 is a protruding region inside the communication pipe 910, and is configured to stop the alignment pipeline 1.

In an embodiment of the present invention, the alignment pipeline 1 includes a pipe body 10, a connection piece 20, a plurality of balls 30, a fixing base 40, and a threaded portion 60. The pipe body 10 is configured to communicate with the communication pipe 910 and allow liquid to flow inside. The pipe body 10 includes a pipe body axis line 11, a first end 12, a second end 13 opposite the first end 12, and a protruding structure 14. The pipe body axis line 11 is an axis line extending along a center of the pipe body 10, and the communication pipe axis line 911 is parallel to the pipe body axis line 11. When the communication pipe axis line 911 and the pipe body axis line 11 are aligned with each other, the alignment pipeline 1 and a communication pipeline 910 are completely aligned. The first end 12 and the second end 13 are two opposite ends of the pipe body 10. The first end 12 is configured to connect to the communication pipe 910. The protruding structure 14 is a protruding region outside the pipe body 10 and is arranged at the first end 12. A shape of the protruding structure 14 corresponds to the limiting structure 912. When the pipe body 10 is inserted into the communication pipe 910, the protruding region of the limiting structure 912 stops and limits movement of the protruding region of the protruding structure 14 to achieve limiting.

As shown in FIG. 1, and FIG. 3 to FIG. 5, the connection piece 20 is arranged at the second end 13 and movably connected to the outer casing 800. In this embodiment, the connection piece 20 is an annular structure and surrounds the pipe body 10. The connection piece 20 includes a first connection surface 21, an outer edge 22, and a second connection surface 23. The first connection surface 21 faces the outer casing 800, the second connection surface 23 faces the fixing base 40, and two opposite sides of the outer edge 22 are respectively connected to the first connection surface 21 and the second connection surface 23.

The plurality of balls 30 is arranged on the first connection surface 21 and the second connection surface 23 of the connection piece 20 in a rolling and dispersing manner. The balls 30 arranged on the first connection surface 21 are in contact with the outer casing 800, and the balls 30 arranged on the second connection surface 23 are in contact with the fixing base 40. Through the design of the balls 30, the connection piece 20 is movable along a radial direction of the pipe body axis line 11 relative to the outer casing 800 and the fixing base 40, so that the alignment pipeline 1 can move up and down relative to the communication pipeline 910. In this embodiment, eight balls 30 are respectively exposed on the first connection surface 21 and the second connection surface 23 to come into contact with the outer casing 800 or the fixing base 40. However, a quantity of the balls 30 is not limited to this. According to the inventor's actual experiment, at least six balls 30 are respectively exposed on the first connection surface 21 and the second connection surface 23, so that the connection piece 20 can smoothly move in a vertical direction relative to the outer casing 800 and the fixing base 40.

In this embodiment, the fixing base 40 is an annular casing, and the fixing base 40 and the outer casing 800 are combined to form an accommodation space 41, so that the surrounding connection piece 20 and the plurality of balls 30 are arranged in the accommodation space 41 in a rolling manner. A gap 50 is formed between the fixing base 40 and the outer edge 22 of the connection piece 20, thereby providing a sufficient moving space for the connection piece 20 to move relative to the outer casing 800 and the fixing base 40, so that the alignment pipeline 1 can move up and down relative to the communication pipeline 910. According to a specific embodiment of the present invention, a threaded portion 60 is arranged at the second end 13, the connection piece 20 is located between the threaded portion 60 and the protruding structure 14, and the threaded portion 60 is used for combining the alignment pipeline 1 and other pipelines or casings.

As shown in FIG. 1 and FIG. 5, when a worker assembles the alignment pipeline 1 and the communication pipeline 910, the worker can insert the communication pipe 910 into the pipe body 10, and move the pipe body 10 to the limiting structure 912 to stop and limit the protruding structure 14, so that horizontal limiting can be achieved. Then, the worker can apply a force to the pipe body 10 along a longitudinal direction, so that the plurality of balls 30 rolls along wall surfaces of the outer casing 800 and the fixing base 40, causing the connection piece 20 to move relative to the outer casing 800. Through rolling of the plurality of balls 30 on the outer casing 800 and the fixing base 40, a friction force of the contact surface can be reduced. In addition, through the moving space provided by the gap 50, the alignment pipeline 1 can be easily moved up and down to align the communication pipe axis line 911 with the pipe body axis line 11, thereby aligning the communication pipeline 910 and the alignment pipeline 1 with each other. In addition, because the communication pipe axis line 911 and the pipe body axis line 11 do not move along a contact surface between the communication pipeline 910 and the alignment pipeline 1, liquid in the pipeline does not flow out along the contact surface, and a good leak-proof effect can be achieved.

According to the design of the pipeline alignment structure and the alignment pipeline of the present invention, through features including rolling of the plurality of balls and the moving space provided by the gap between the connection piece 20 and the fixing base 40, the friction force of the contact surface can be reduced, and a joint connection portion between the communication pipeline and the alignment pipeline can be easily aligned. The liquid in the pipeline does not flow out along the contact surface, thereby achieving the good leak-proof effect. In addition, there is no need to mount an additional O-ring outside the pipeline, which can save material and assembly costs, and resolve the problem existing in the prior art.

It should be noted that, the foregoing is merely embodiments, but is not intended to be limited in the embodiments. For example, basic architectures without departing from the present invention shall fall within the protection scope claimed by the patent, and should be subject to the scope of the claims.

What is claimed is:

1. An alignment pipeline, arranged on an outer casing and configured to connect to a communication pipe, wherein the communication pipe has a communication pipe axis line, and the alignment pipeline comprises:
   a pipe body, having a pipe body axis line and comprising a first end and a second end opposite to the first end, wherein the first end is configured to connect to the communication pipe;
   a fixing base;
   a connection piece, surrounding the pipe body, arranged at the second end, and movably connected to the outer casing, wherein the connection piece comprises a second connection surface, the second connection surface faces the fixing base; and
   a plurality of balls, arranged on the connection piece in a rolling and dispersing manner, wherein at least a part of the balls are in contact with the outer casing, the part of the balls are arranged on the second connection surface and in contact with the fixing base, so that the connection piece is movable relative to the outer casing along a radial direction of the pipe body axis line, and when the communication pipe is inserted into the first end, the connection piece moves relative to the outer casing, to align the pipe body axis line with the communication pipe axis line.

2. The alignment pipeline according to claim 1, wherein the connection piece comprises a first connection surface, the first connection surface faces the outer casing, and the part of the balls are arranged on the first connection surface and in contact with the outer casing.

3. The alignment pipeline according to claim 2, wherein a quantity of the plurality of balls arranged on the first connection surface is at least 6.

4. The alignment pipeline according to claim 1, wherein the fixing base is combined with the outer casing to form an accommodation space for accommodating the plurality of balls and the connection piece.

5. The alignment pipeline according to claim 4, wherein the connection piece comprises an outer edge, and a gap is formed between the outer edge and the fixing base.

6. The alignment pipeline according to claim 4, wherein a quantity of the plurality of balls arranged on the second connection surface is at least 6.

7. The alignment pipeline according to claim 1, wherein the pipe body further comprises a protruding structure arranged at the first end; the communication pipe further comprises a limiting structure; and when the communication pipe is inserted into the first end, the limiting structure limits movement of the protruding structure to achieve limiting.

8. The alignment pipeline according to claim 7, wherein the alignment pipeline further comprises a threaded portion, the threaded portion is arranged at the second end, and the connection piece is located between the threaded portion and the protruding structure.

9. A pipeline alignment structure, connected to an outer casing, wherein the pipeline alignment structure comprises:
   a communication pipe, having a communication pipe axis line; and
   an alignment pipeline, comprising:
   a pipe body, having a pipe body axis line and comprising a first end and a second end opposite to the first end, wherein the first end is configured to connect to the communication pipe;
   a fixing base;
   a connection piece, surrounding the pipe body, arranged at the second end, and movably connected to the outer casing, wherein the connection piece comprises a second connection surface, the second connection surface faces the fixing base; and
   a plurality of balls, arranged on the connection piece in a rolling and dispersing manner, wherein at least a part of the balls are in contact with the outer casing, and the part of the balls are arranged on the second connection surface and in contact with the fixing base, so that the connection piece is movable relative to the outer casing along a radial direction of the pipe body axis line, and when the communication pipe is inserted into the first end, the connection piece moves relative to the outer casing, to align the pipe body axis line with the communication pipe axis line.

10. The alignment pipeline structure according to claim 9, wherein the connection piece comprises a first connection surface, the first connection surface faces the outer casing, and the part of the balls are arranged on the first connection surface and in contact with the outer casing.

11. The alignment pipeline structure according to claim 10, wherein a quantity of the plurality of balls arranged on the first connection surface is at least 6.

12. The alignment pipeline structure according to claim 9, wherein the fixing base is combined with the outer casing to form an accommodation space for accommodating the plurality of balls and the connection piece.

13. The alignment pipeline structure according to claim 12, wherein the connection piece comprises an outer edge, and a gap is formed between the outer edge and the fixing base.

14. The alignment pipeline structure according to claim 12, wherein a quantity of the plurality of balls arranged on the second connection surface is at least 6.

15. The alignment pipeline structure according to claim 9, wherein the pipe body further comprises a protruding structure arranged at the first end; the communication pipe further comprises a limiting structure; and when the communication pipe is inserted into the first end, the limiting structure limits movement of the protruding structure to achieve limiting.

16. The alignment pipeline structure according to claim 15, wherein the alignment pipeline further comprises a threaded portion, the threaded portion is arranged at the second end, and the connection piece is located between the threaded portion and the protruding structure.

* * * * *